Dec. 5, 1961  W. G. STOECKICHT  3,011,365
PLANETARY GEARING WITH DOUBLE HELICAL GEARS
Filed Jan. 30, 1959  5 Sheets-Sheet 5

INVENTOR.
Wilhelm G. Stoeckicht.
BY
Harness, Dickey & Pierce.
ATTORNEYS.

United States Patent Office 3,011,365
Patented Dec. 5, 1961

3,011,365
PLANETARY GEARING WITH DOUBLE HELICAL GEARS
Wilhelm G. Stoeckicht, 4 Rugendasstr, Munchen-Solln, Germany
Filed Jan. 30, 1959, Ser. No. 790,086
Claims priority, application Germany Feb. 15, 1958
7 Claims. (Cl. 74—801)

This invention is concerned with planetary gearing having double helical gears.

Planetary gear mechanisms with double helical or herringbone gears have been known for a long time. However, they were introduced into common use only when it was known to provide them with automatic tooth pressure balance, and in doing so to divide at least one of the central gears in such a way as to effect a tooth pressure balance in each one of the helices independently from one another. These planet gear mechanisms with herringbone or—as it is also called—double helical gears, have successfully introduced planetary gearing into common use even for high outputs and speeds. However, they have so far been burdened with the relatively complicated and therefore also expensive construction of the center gear group, which always had to be divided.

It is the object of the invention to construct a helical gear mechanism in such a way as to eliminate the above drawbacks and to render possible a sturdier and simpler construction of such planetary gearing, the manufacturing of which as a result of this will also be less expensive.

It is another object, in several forms of the invention, to provide an improved double helical gearing construction for planetary gear mechanisms, in which one group of teeth may be fabricated by a simple turning process, thus eliminating the need for expensive tooth forming operations.

Other objects, features, and advantages of the present invention will become apparent from the subsequent description, taken in conjunction with the accompanying drawings.

According to the invention this task is solved by constructing the double helical or herringbone teeth of such planetary gearing in such a manner that the tooth helices of the two herringbone sections are made of different sizes and angles.

The application of this concept to planetary gearing brings about special advantages for such gearing, which advantages will be explained with the aid of the attached drawings.

Figure 1:
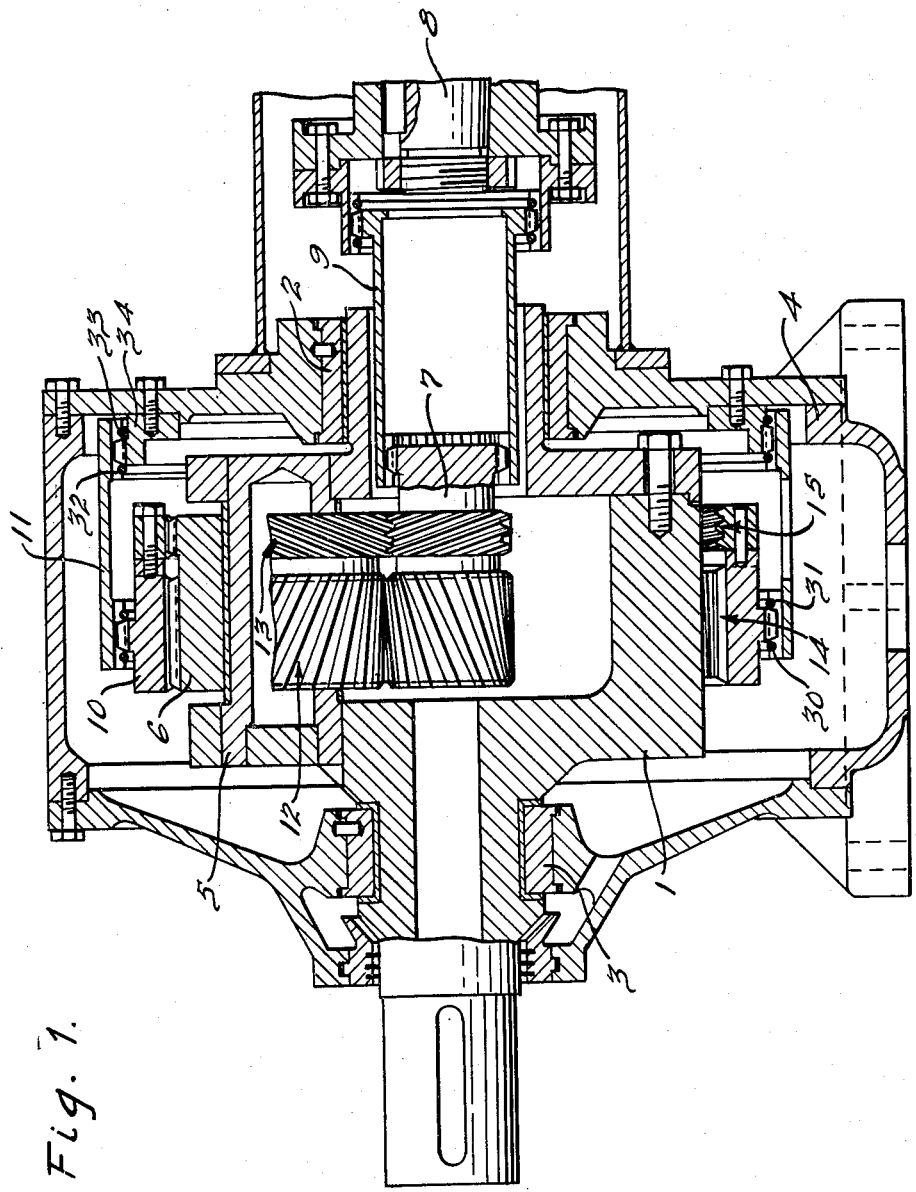
FIGURE 1 is an axial section, partially in elevation, through planetary gearing constructed according to the invention, with a rotating planet gear carrier.

In FIGURE 1, a planet gear carrier 1 is rotatably supported by means of two bearings 2 and 3 in a housing 4. In carrier 1, the axial position of which is fixed by bearing 3, planet gears 6 are rotatably mounted on bearing bolts 5, one of the planet gears being partially shown in section. Planet gears 6 are in engagement with a sun gear 7 which is free-floating in a known manner and is connected to a shaft 8 by means of a flexible coupling 9. Planet gears 6 are also in engagement with a ring gear 10 which is connected to the part receiving its torque, in this case housing 4, by means of a double-toothed coupling 11. Flexible coupling 9 is also shown as a double-toothed coupling of known type which has proved to be efficient in service and permits axial displacement of sun gear 7.

The planet gear mechanism is provided with herringbone or double helical gears, i.e. one helix generally indicated at 12, which is the broader one, is provided with an angle common with herringbone gears, while the other helix 13, which is the narrower one, is provided with a substantially larger helix angle.

In the embodiment shown in FIGURE 1, planet gears 6 and sun gear 7 are each made in one piece, while ring gear 10 is made of two parts divided in accordance with the two helices, helix 14 being in engagement with the helix 12 of planet gears 6, the other helix 15 being in engagement with helix 13 of planet gears 6. Both sections of ring gear 10 are combined into one unit after assembling the gearing.

Figure 2:
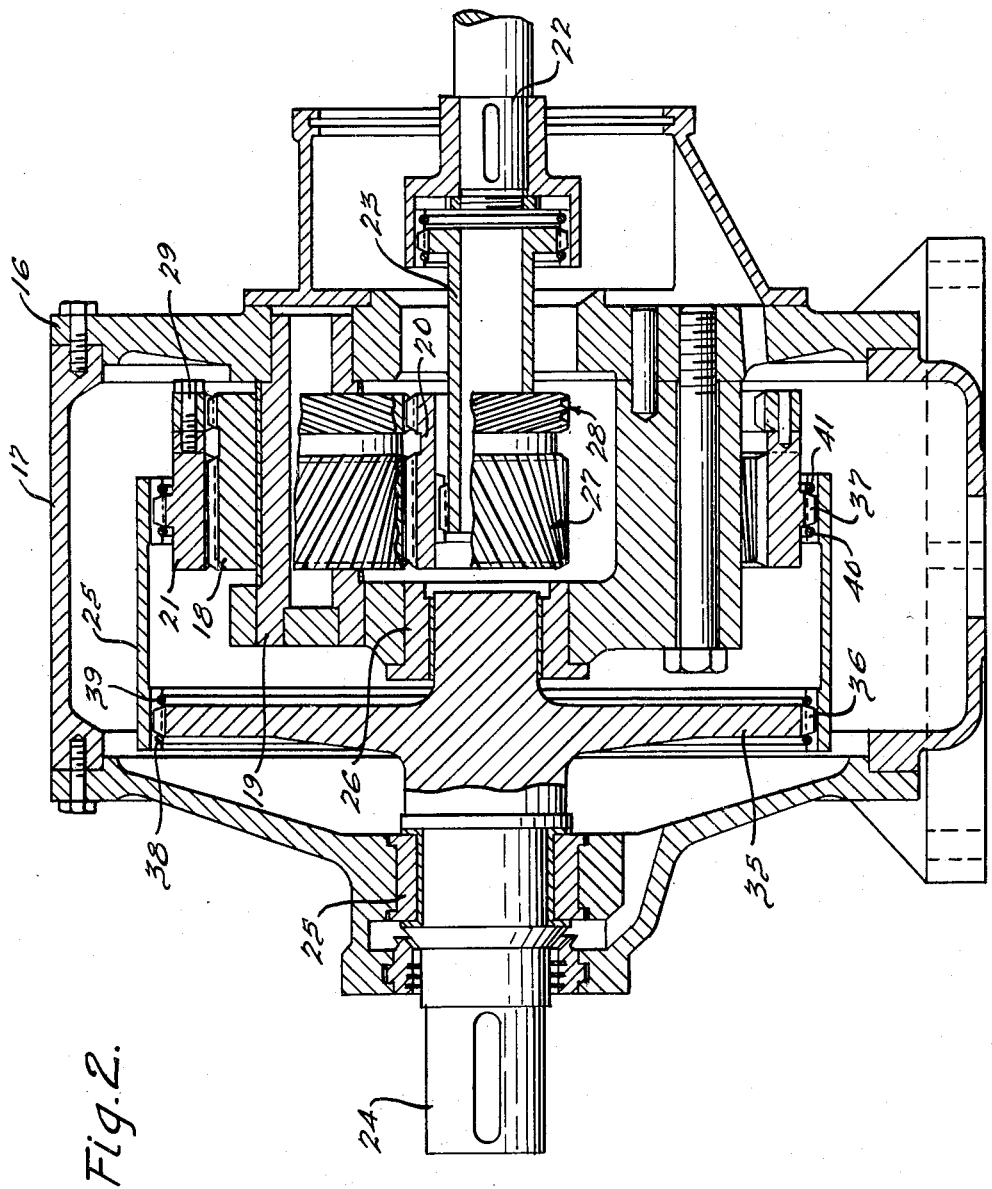
FIGURE 2 is an axial section through a modified planetary gearing according to the invention with a stationary planet gear carrier, this type of planet gearing also being called stationary gearing.

In the embodiment of FIGURE 2, carrier 16 is rigidly connected to housing 17. Planet gears 18 are rotatably supported in carrier 16 by bearing pins 19, and are in engagement with sun gear 20 and ring gear 21. The sun gear is adapted to be free-floating in a known manner and is connected to shaft 22 by a double-toothed flexible coupling 23 which permits axial displacement of the sun gear. Ring gear 21 is flexibly connected by a double-toothed coupling 25 to shaft 24 which receives its torque. Shaft 24 is supported by means of two bearings 25 and 26, the axial position of shaft 24 being fixed by bearing 25. Gears 18, 20 and 21 are provided with double helical teeth as in FIGURE 1, the teeth of the two helices having different helix angles. One helix 27, which is the broader one, is provided with an angle which is common for herringbone gears, while the other helix 28, which is the less broad one, has a substantially larger angle. As is the case with the embodiment shown in FIGURE 1, the intermediate gears 18 and sun gear 20 are not divided, while the ring gear 21 is divided in accordance with the two helices but is combined into one unit by means of screws 29.

In the example shown in FIGURE 1 as well as in that shown in FIGURE 2, the planet or intermediate gears 6 and 18, respectively, are supported so as to permit sideward play or adjusting movements. In both examples, the axial guidance of the gear set is achieved by the fact that the connection of the ring gear 10 or 21 with its torque-receiving part (4 or 24) is constructed with axial guidance. For this purpose, in the example of FIGURE 1, a toothed ring 34 is rigidly connected with housing 4. Toothed coupling 11 is provided with two ring gears, one of them engaging the teeth of the coupling gear ring which is provided on helix 14, the other one engaging the teeth of the coupling ring 34. Spring rings 30, 31, 32, 33, which respectively engage grooves in the coupling gear rings of the toothed coupling 11, fix the axial position of helix 14 and, in doing so, the position of the ring gear 10.

In a corresponding manner, in FIGURE 2, shaft 24 is provided with a disc 35, the outside circumference of which has a coupling gear ring 36. Ring gear 21 in its turn is provided with a coupling gear ring 37, this ring being provided on the ring gear part having the smaller helix angle in the illustrated embodiment. The two toothed coupling rings of the toothed coupling 35 engage gear rings 36 and 37, the axial position of ring gear 21 again being fixed by means of spring rings 38, 39, 40, 41. Of course, the axial guidance of the gear set may also be carried out by one of its remaining parts, as for instance by the sun gears 7 or 20, respectively, or by one of the planet or intermediate gears 6 or 18, respectively.

Double helical gearing with unsymmetrical helix angles (which is also called asymmetrical herringbone gearing) is outstanding for the following properties:

(1) The main part of the circumferential load is taken by the broader herringbone section, which is provided with the smaller helix angle;

(2) The forces for axial guidance and adjustment are substantially increased as compared to symmetrical herringbone gearing; the total gear width becomes smaller;

(3) The torsion conditions are much more favorable than in the case of the symmetrical herringbone gearing.

For planetary gearing the application of asymmetrical herringbone construction brings about a number of advantages which may be described in the following manner.

To illustrate these advantages it may be assumed that a substantial difference is chosen between the angles of the two helices which results in a distribution of the circumferential loads in a ratio of for instance 4:1. This means that the broader helix would take 80 percent, and the smaller one which is provided with the larger helix angle would take 20 percent of the circumferential load. This would bring about axial adjustment forces which would be higher than those involved with the symmetrical herringbone gearing by 60 percent. As explained above, the asymmetrical herringbone gearing results in reduced gear widths, and thus also reduced gear masses. There is another way in which the balancing effect of the axial tooth forces is of great advantage as compared with symmetrical herringbone gearing. In view of the small load portion to be taken by the narrower gear part with the larger helix angle, a two-part divided construction of the ring gear with a view to achieving a separate load balance for each of the helix systems may be omitted as regards this part; in the gearing according to the invention, this separate load balance is no longer necessary, because the substantially more efficient balancing effect of the axial tooth forces guarantees the maintenance of the desired distribution of loads on the helices.

The possibility thus offered of omitting the separate adjusting facility in the two helix systems means a substantial simplification and thus a reduction in the cost of designing and manufacturing the outside center or ring gears. While up to now a flexible connection of the two halves of the ring gear has been necessary, this can now be replaced by a simple rigid connection.

The application of asymmetrical double helical or herringbone gearing to planetary gearing brings about advantages for the operation of a planetary gearing with respect to torsional forces on the inner center gear or sun gear. Here, especially in the case of larger transmission ratios, the diameters of the sun gears become very small; this is a result mainly of the manifold gear engagements which, in comparison to a single gear engagement result in a multiplication of the transferable torque and thus of the torsional forces.

In the case of symmetrical herringbone gearing each helix transfers half of the torque and is subjected to a torsional force by this half of the torque. However, the helix first in line looking in the direction of the power flow will be additionally twisted by the torque half of the second helix which passes through the first helix. The result is a very high torsion on the first helix and a great difference between the torsional forces on the two helices, this difference rendering compensation measures very difficult.

As regards torsion, asymmetrical gearing has much more favorable conditions. This is to be attributed to the fact that the helix provided with the larger angle has a smaller width and that, as a result of the larger tooth angle the twisting is not fully effective as a circumferential force but only as the projection on the normal line to the tooth flank. If the arrangement in a gear is made in such a way that, looking in the direction of the power flow the helix with the larger angle is first in line, one is free to adjust the torsional forces in the two helices relative to one another over a wide range.

Thus herringbone gearing or double helical gearing with different helix angles, which may also be called asymmetrical herringbone gearing, offer interesting and important advantages for application to planetary gearing with automatic load balance.

Figure 3:
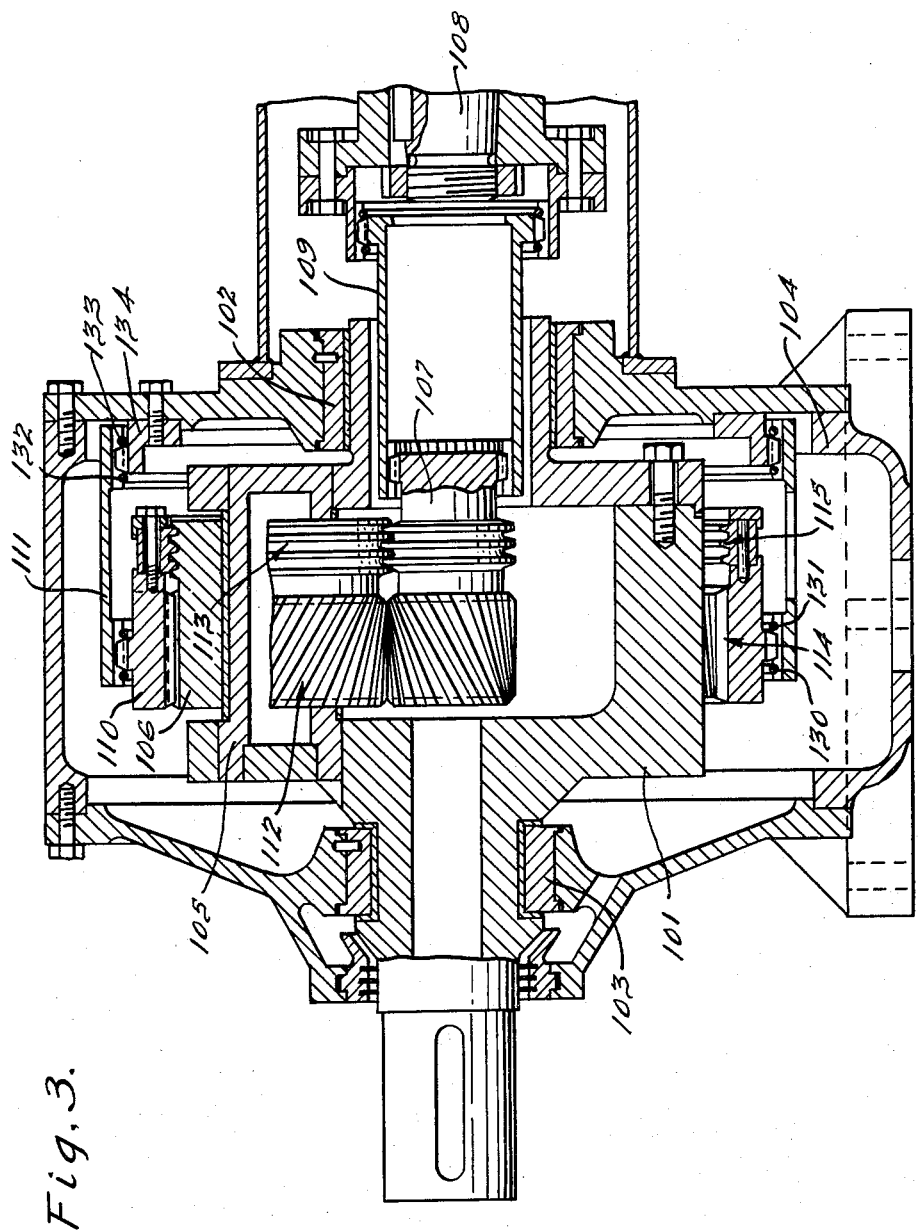
FIGURE 3 is a longitudinal section, partially in elevation, through another embodiment with a rotating planet gear carrier, in which one helix is at a 90° angle.

The remaining figures illustrate additional embodiments of the invention in which the larger helix angle is given the value of 90°, this construction offering special advantages outlined below. In FIGURE 3, a planet gear carrier 101 is rotatably supported by means of two bearings 102 and 103 in a housing 104. In carrier 101, the axial position of which is fixed by means of bearing 103, there are five planet gears 106 pivotally mounted on bearing pins 105, one of the planet gears 106 being partially shown in section. Planet gears 106 are in engagement with the inside center or sun gear 107, which is free-floating in a known manner and is connected by a flexible coupling 109 to a shaft 108. Planet gears 106 are also in engagement with the outside center or ring gear 110, which in its turn is connected to the part receiving its torque, in this case housing 104, by a double-toothed coupling 11. Flexible coupling 109 is also shown here as a double-toothed coupling of a known type which has proved to be efficient in service and which permits axial displacement of sun gear 107.

The gears of this planet gearing are provided with asymmetrical herringbone or double helical gearing, i.e. one helix 112, which is the broader one, is provided with an angle which is common in herringbone gears, while the other helix has an angle of 90°, so that its teeth have the profile of a toothed rack. In the embodiment shown by example in FIGURE 3, planet gears 106 and sun gear 107 are made in one piece, while ring gear 110 is of split construction, divided in accordance with the two helices, helix 114 being in engagement with helix 112 of planet gears 106 and helix 115 being in engagement with helix 113 of planet gears 106. After assembling the gearing, the two sections of ring gear 110 are secured together as one unit.

Figure 4:
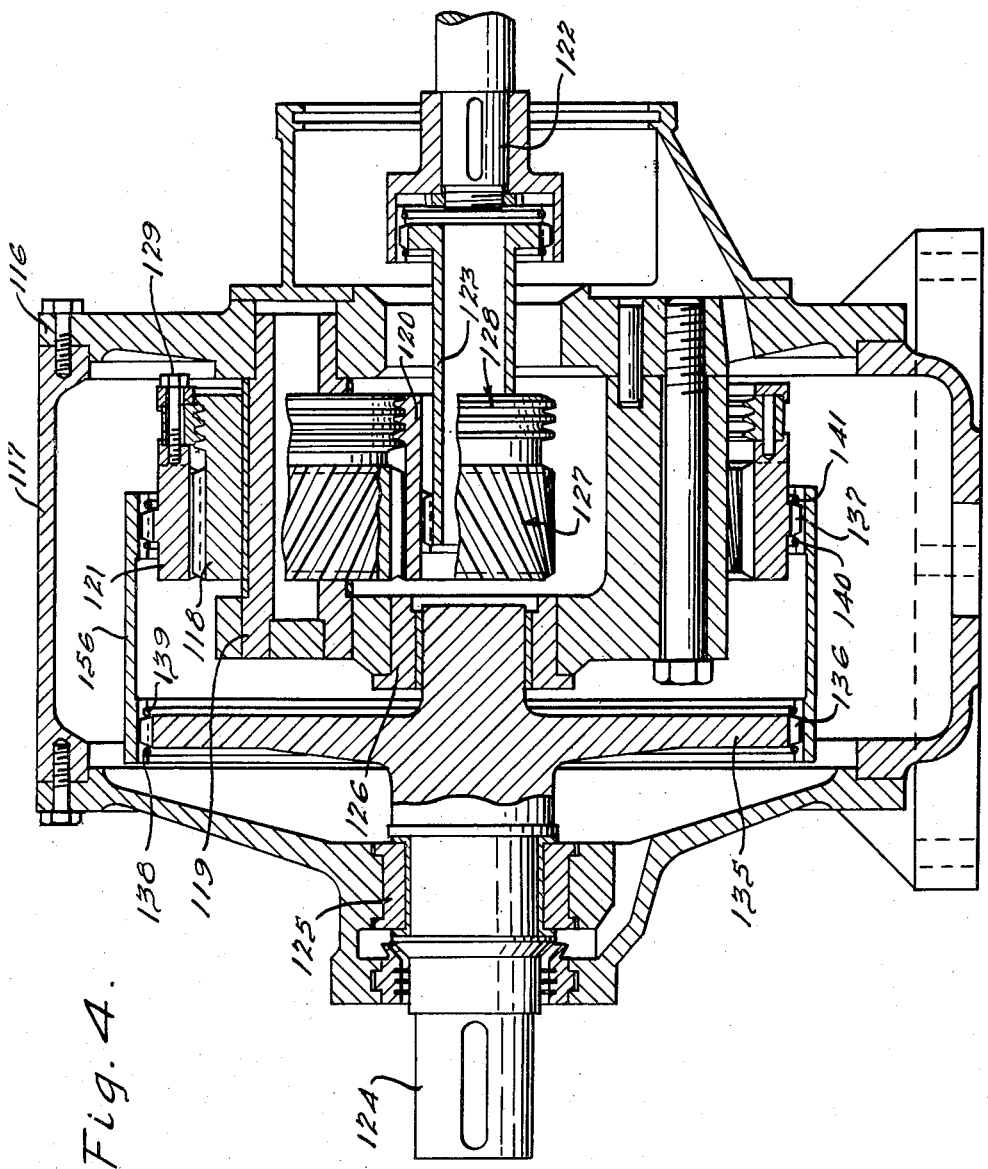
FIGURE 4 is a longitudinal section through still another embodiment of the invention with a stationary carrier and one helix of 90°.

In the embodiment shown in FIGURE 4, carrier 116 is rigidly connected to a housing 117. In carrier 116 the planet gears or intermediate gears 118 are pivotally supported in a known way on bearing pins 119, and are in engagement with an inside center or sun gear 120 and with an outside center or ring gear 121. Sun gear 120 is adapted to be unsupported or free-floating in a known way and is non-rotatably but flexibly connected to a shaft 122; in the present case this flexible connection is achieved by means of a double-toothed coupling 123 which also permits axial displacement of sun gear 120. Ring gear 121 is flexibly connected to the part receiving its torque, which in this case is a shaft 124, by means of a double-toothed coupling 156. Shaft 124 is supported by means of two bearings 125 and 126, the axial position of shaft 124 being fixed by means of bearing 125. Gears 118, 120 and 121 are provided with double helical toothing—same as is the case in the example of FIGURE 3—which in the two helices have different angles, i.e. one helix 127, which is the broader one, is provided with an angle which is common in herringbone gearing, while the other one has an angle of 90°. As in the case of the embodiment shown in FIGURE 3, intermediate gears 118 and inside center gear 120 are of unitary or undivided construction, while outside center gear 121 is of split construction, that is, divided in accordance with the two helices but with the two parts connected by means of screws 129 to form one unit.

In the case of the example according to FIGURE 3 as well as in that of FIGURE 4, planet gears 106 and 118, respectively, are supported with sideward play in order to enable them to carry out axial adjusting movements. In both cases the axial guidance or positioning of the gear set is accomplished by the fact that the connection of ring gear 110 and 121, respectively, to the part 104 and 124, respectively, receiving its torque is constructed with axial guidance or positioning properties. For this purpose, in the case of the embodiment shown in FIGURE 3, a gear ring 134 is connected to housing 104. Toothed coupling 111 is provided with two ring gears, one of them being in engagement with the teeth of a coupling gear ring provided on ring gear helix 114 and the other one being in engagement with the teeth of coupling gear ring 134. Spring rings 130, 131, 132 and 133, which are in engagement with respective grooves of the coupling gear rings of the toothed coupling 111, fix the axial position of helix 114 and, with this the position of outside center gear 110.

Correspondingly, in the embodiment shown by way of example in FIGURE 4, shaft 124 is provided with a disc 135, the outer circumference of which is equipped with a coupling gear ring 136. The part of ring gear 121 having the smaller helix angle is provided with a coupling gear ring 137. The two coupling gear rings of the toothed coupling 156 are in engagement on the one hand with the gear ring 136 and on the other hand with the gear ring 137, the axial position of the outside center gear 121 again being fixed by means of spring rings 138, 139, 140 and 141. It will be understood that axial guidance and positioning of the gear set may be carried out as well by any of its remaining parts, for instance by sun gear 107 or 120, respectively, or by one of the planet gears 106 or 118, respectively.

Figure 5:
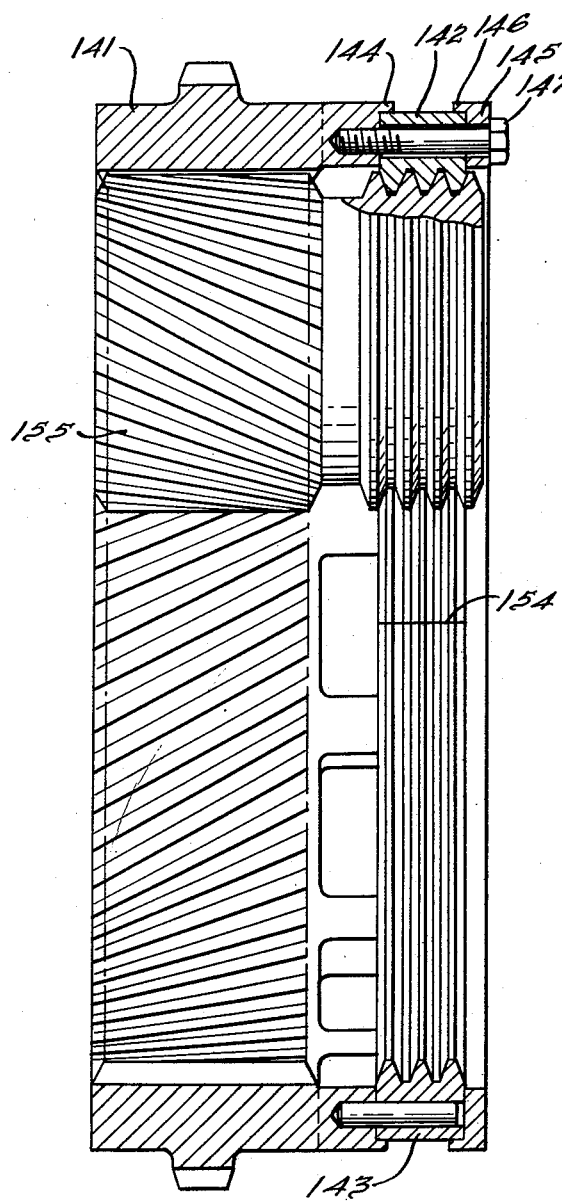
FIGURES 5 and 6 show additional embodiments illustrating ways of constructing the ring gear in accordance with the invention.

FIGURE 5 shows in detail the construction of the outside center or ring gear according to FIGURES 3 or 4, respectively, especially the connection of the two gear parts. While part 141 is constructed in a known way, the other part 142, 143 is longitudinally divided as indicated at 154 and is surrounded by a shoulder 144 formed on gear part 141 and a shoulder 146 formed on a ring 145, the whole being held together by means of screws 147. This way of dividing the one gear section which is provided with a helix angle of 90° permits simple assembling of the gear. For the sake of a better illustration, FIGURE 5 also shows a planet gear 155.

Figure 6:
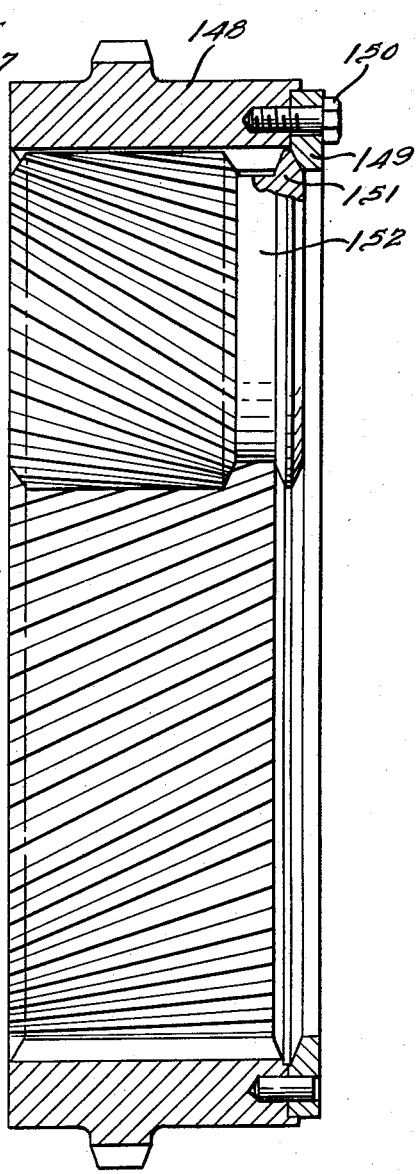

Another possible manner of constructing the divided gear is shown in FIGURE 6. Here as well the ring gear consists of two sections 148 and 149, which are secured together by means of screws 150 and which surround the counter tooth 151 of the planet gear 152 on both sides. Here the teeth of ring gear part 148 extend across the entire width of part 148, so that the lateral front faces of the teeth are immediately adjacent counter tooth 151. It will be noted that in this case a division of the ring gear parts in a transverse plane is provided which renders possible assembly of the gearing. This construction is particularly useful when the gear part having the 90° helix angle consists of only a single tooth, as is shown here. The manner of division which is shown here is also suitable in cases where it is desired to construct inside center or sun gear in a divided manner, which may be the case for assembly reasons. In this case it will be advisable to have the sun gear part with the 90° helix angle arranged last in line looking in the direction of the power flow.

The illustrations show planetary gearing with asymmetrical herringbone or double helical teeth, one helix angle assuming the limiting value of 90°. It is however possible that at the same time the other helix angle assume the other limiting value, namely 0°, which means that it may be constructed as a straight spur gearing. Such an adaptation of the invention may be advantageous in cases where for example an axial thrust is to be transferred on the housing from the region of the sun gear without the use of longitudinal or thrust bearings (as is shown in FIGURE 3).

By selecting the limiting value of 90° for the helix having the larger angle, the described construction of this helix offers the advantage that its tooth profile may be shown as a tooth rack profile. This means that this gearing may be manufactured in a turning process, for instance by means of a rack tool, which entails a substantial reduction in the manufacturing cost because neither expensive special machines nor expensive tools are required for the gearing.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a gear set having first and second concentric gears and at least one intermediate gear on an axis spaced from the concentric gear axis and meshing with said concentric gears, first, second and third elements for receiving the torque of said gears, a first section of teeth on each gear having a predetermined first helix angle and a second section of teeth having a substantially different second helix angle in the opposite direction, said second helix angle being less than 90° but greater than said first helix angle to such an extent that the circumferential forces applied to the teeth of said first gear section are a multiple of the circumferential forces applied to the teeth of said second gear section, said gear sections having the larger helix angle being smaller in width than the gear sections having the smaller helix angle, means for connecting said concentric gears to two of said elements respectively, at least one of said connecting means consisting of a single flexible coupling member, means for connecting said intermediate gear to the third of said elements, means for preventing axial movement of one of said gears, and means for permitting axial movement of the other gears.

2. In a gear set having first and second concentric gears and at least one intermediate gear on an axis spaced from the concentric gear axis and meshing with said concentric gears, first, second and third elements for receiving the torque of said gears, a first section of teeth on each of said gears having a predetermined first helix angle and a second section of teeth on each of said gears having a substantially different second helix angle in the opposite direction, said second helix angle being greater than said first helix angle to such an extent that the circumferential forces applied to the teeth of said first gear section are a multiple of the circumferential forces applied to the teeth of said second gear section, means for connecting said concentric gears to two of said elements respectively, at least one of said connecting means consisting of a single flexible coupling member, said first concentric gear having a smaller pitch diameter than said second concentric gear, said second gear section of said first concentric gear being closer to the element receiving its torque than said first gear section having the smaller helix angle, means for connecting said intermediate gear to the third of said elements, means for preventing axial movement of one of said gears, and means for permitting axial movement of the other gears.

3. In a gear set, first and second concentric gears, a plurality of intermediate gears on axes spaced from the axis of said concentric gears and meshing with said concentric gears, herringbone teeth on said gears, the two sections of said teeth having substantially different helix angles, first, second and third elements for receiving the torque of said gears, means for connecting said concentric gears to two of said elements, at least one of said connecting means consisting of a single flexible coupling member, means for connecting said intermediate gears to the third of said elements, means for preventing axial movement of one of said gears, and means for permitting axial movement of the other gears.

4. In a gear set having first and second concentric gears and at least one intermediate gear on an axis spaced from the concentric gear axis and meshing with said concentric gears, first, second and third elements for receiving the torque of said gears, a first gear section on each gear having a helix angle of less than 90° and a second gear section on each gear comprising at least one tooth having a 90° helix angle, means for connecting said concentric gears to two of said elements respectively, at least one of said connecting means consisting of a single flexible coupling member, means for connecting said intermediate gear to the third of said elements, means for preventing axial movement of one of said gears, and means for permitting axial movement of the other gears.

5. In a gear set having first and second concentric gears and at least one intermediate gear on an axis spaced from the concentric gear axis and meshing with said concentric gears, first, second and third elements for receiving the torque of said gears, a first section of teeth on each gear having a predetermined first helix angle and a second section of teeth on each gear having a substantially different second helix angle in the opposite direction, said second helix angle being smaller than 90° and being greater than said first helix angle to such an extent that the circumferential forces applied to the teeth of said first gear section are a multiple of the circumferential forces applied to the teeth of said second gear section, means for connecting said concentric gears to two of said elements respectively, at least one of said connecting means consisting of a single flexible coupling member, means for connecting said intermediate gear to the third of said elements, means for preventing axial movement of one of said gears, and means for permitting axial movement of the other gears.

6. In a gear set having first and second concentric gears and at least one intermediate gear on an axis spaced from the concentric gear axis and meshing with said concentric gears, first, second and third elements for receiving the torque of said gears, a first set of teeth on each gear having a predetermined first helix angle and a second set of teeth on each gear having a substantially different second helix angle in the opposite direction, said second helix angle being smaller than 90°, means for connecting said concentric gears to two of said elements respectively, at least one of said connecting means consisting of a single flexible coupling member, means for connecting said intermediate gear to the third of said elements, means for preventing axial movement of one of said gears, and means for permitting axial movement of the other gears.

7. In a herringbone tooth gear set, first and second concentric gears and at least one intermediate gear on an axis offset from the axis of said concentric gears and meshing with said concentric gears, first, second and third elements for receiving the torque of said gears, a first set of teeth on each gear having a predetermined first helix angle smaller than 45° and a second set of teeth on each gear having a second helix angle in the opposite direction, said second helix angle being substantially greater than said first helix angle and lying between 45° and 90°, means for connecting said concentric gears to two of said elements respectively, at least one of said connecting means consisting of a single flexible coupling member, means for connecting said intermediate gear to the third of said elements, means for preventing axial movement of one of said gears, and means for permitting axial movement of the other gears.

References Cited in the file of this patent
UNITED STATES PATENTS

| | | |
|---|---|---|
| 1,399,549 | Fast | Dec. 6, 1921 |
| 1,548,545 | Niederhauser | Aug. 4, 1925 |
| 1,861,258 | Bethune | May 31, 1932 |
| 2,067,477 | Cooper | Jan. 12, 1937 |
| 2,231,784 | Von Thungen | Feb. 11, 1941 |
| 2,591,734 | Smith et al. | Apr. 8, 1952 |
| 2,703,021 | Stoeckicht | Mar. 1, 1955 |